May 5, 1931.  A. OLSEN, JR., ET AL  1,804,026
CANDY HANDLING SYSTEM
Filed July 11, 1928   2 Sheets-Sheet 2
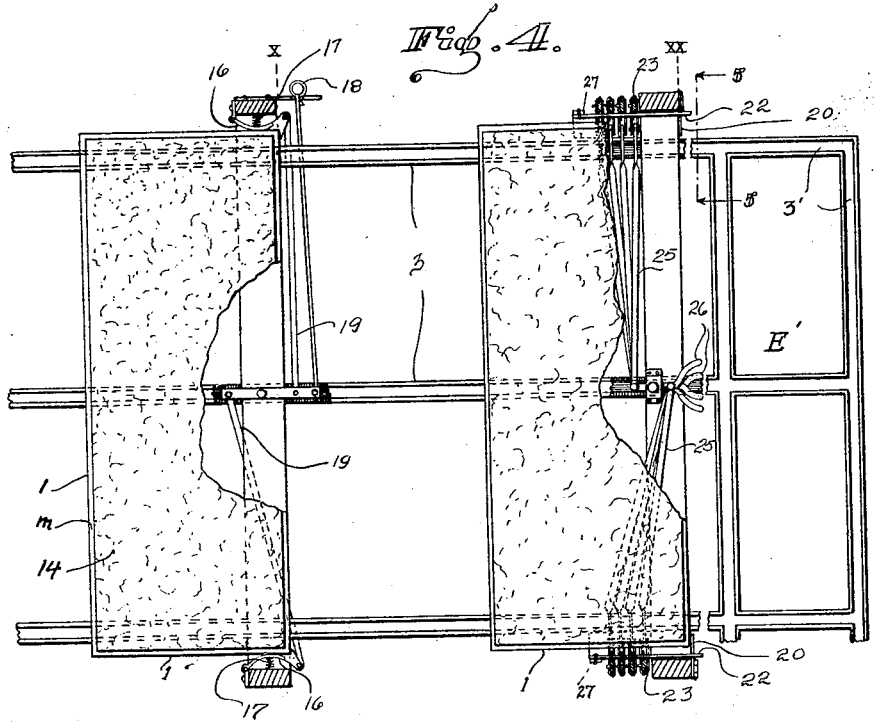
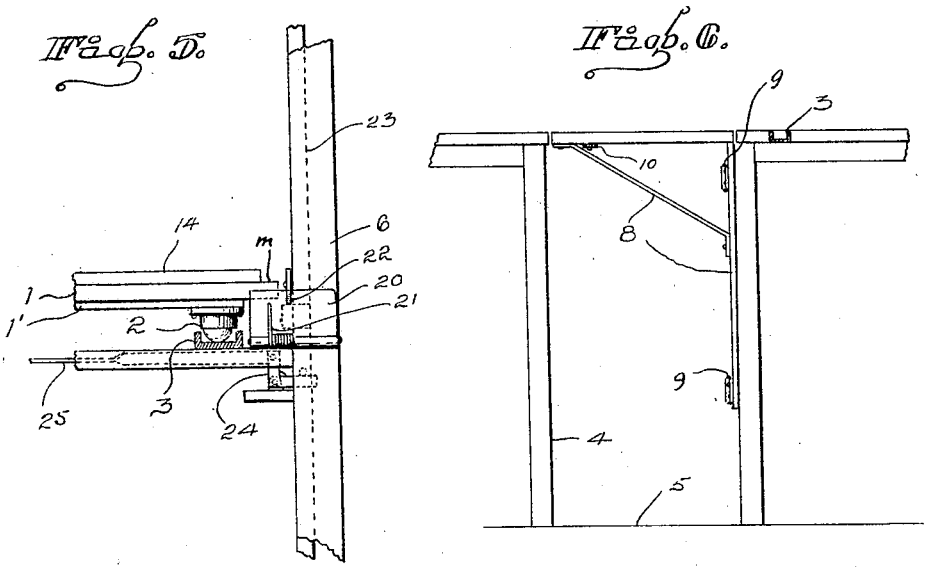
INVENTORS
Andrew Olsen Jr.
James A. Olsen
BY Miller + Bayken
ATTORNEYS.

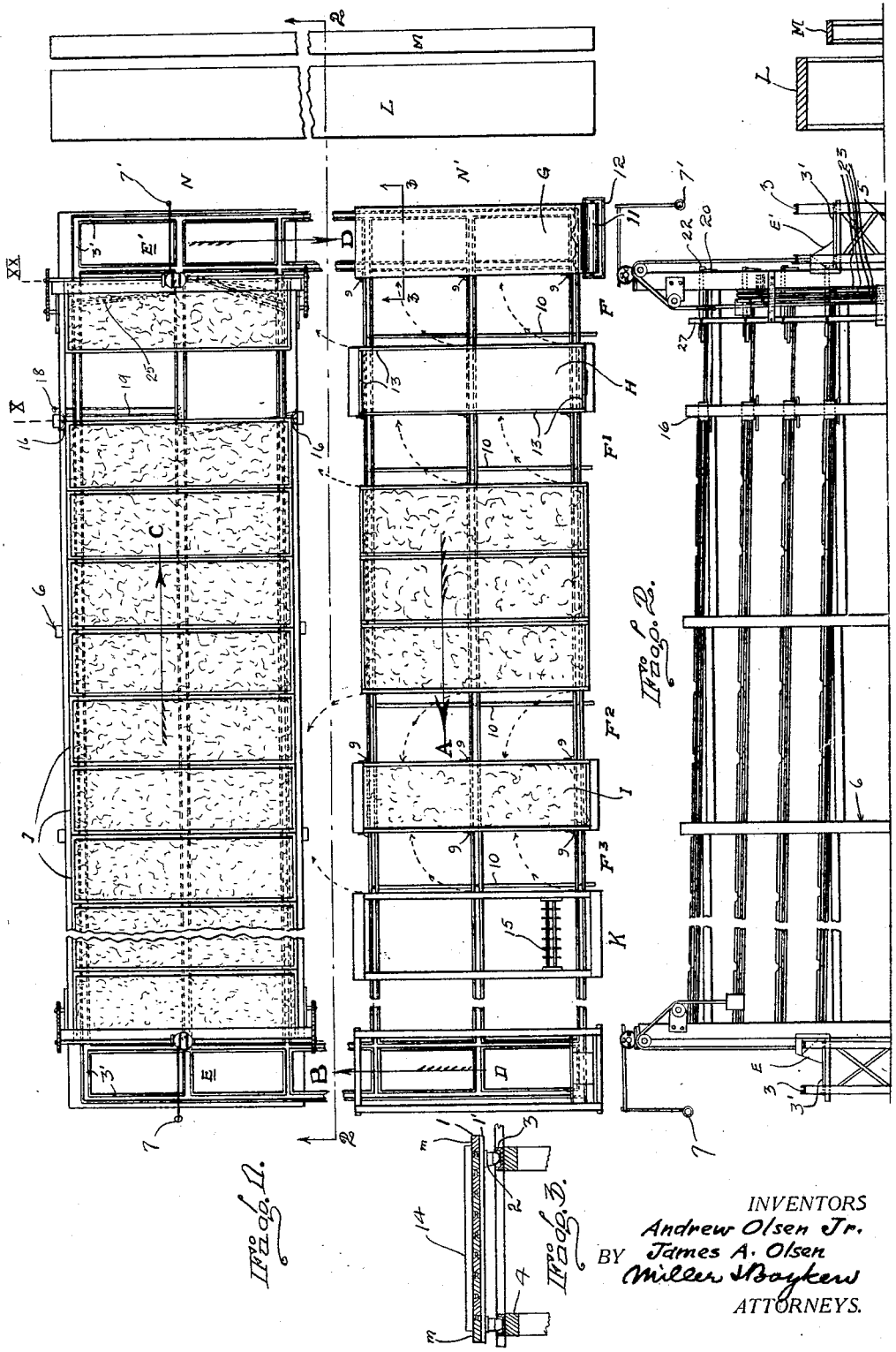

Patented May 5, 1931

1,804,026

UNITED STATES PATENT OFFICE

ANDREW OLSEN, JR., AND JAMES A. OLSEN, OF SAN FRANCISCO, CALIFORNIA, ASSIGNORS TO GOLDEN NUGGET SWEETS, OF SAN FRANCISCO, CALIFORNIA, A FIRM

CANDY HANDLING SYSTEM

Application filed July 11, 1928. Serial No. 291,896.

This invention relates to the wholesale manufacture of candy and has to do with a system or method of handling large slabs of candy in the pouring, cooling, and cutting thereof and has for its objects improvements in apparatus and arrangement whereby a large quantity of candy may be easily and quickly handled with a minimum of labor.

Briefly described our method of handling candy comprises a series of movable slab boards upon each of which a slab of candy is poured and spread out, the boards being moved along in an endless fashion under and past stationary machines for scoring the slabs into bars, thence into cooling racks in superimposed layers and along the cooling racks to the beginning of the series where the candy is removed and a fresh slab poured.

In the drawings accompanying this application Fig. 1 is a plan view of the layout of apparatus as arranged in a candy making plant.

Fig. 2 is an elevation of the cooling rack portion of the apparatus as seen from the line 2—2 of Fig. 1.

Fig. 3 is a cross section of one of the candy slab boards showing a candy slab thereon and the board supported on ball casters rollable in upwardly directed channel iron tracks.

Fig. 4 is an enlarged plan section of the discharge end of the cooling racks taken between any two layers of slab boards and showing manually operated stops or trips for the boards at the points X—XX of the racks.

Fig. 5 is an end view of the rack of Fig. 4 as seen from the line 5—5 thereof to clarify the action of the trips at the ends of the rack.

Fig. 6 is a detail of certain hinged sections of track.

In the drawings the numeral 1 designates a plurality of separate slab boards or tables on which the candy slabs are poured, cooled and cut.

These boards may be of metal or wooden construction, the latter being shown in Fig. 3 of the drawings wherein a layer of longitudinally extending boards 1 are braced underneath by cross pieces 1' to which casters 2 are secured. These casters are preferably of the ball type so that the tables or boards may more easily be rolled in all directions in the channel tracks 3 in which they are supported. The tracks are supported on suitable frame work 4 of a height from the floor 5 to bring the boards to about the height of a table for convenient handling of the candy mass by the operatives, and the direction of travel of the boards is about the four sides of a quadrangle as denoted by the arrows A, B, C and D in Fig. 1.

The run along A is either level or slightly downhill to the left so as to make the rolling of the boards easier. At the left-hand end D of run A the channel tracks lead at right angles to E which is an elevator for delivering the board to any of the plurality of layers in run C or cooling rack 6 as shown in Fig. 2.

The layers of candy boards 1 in rack 6 are inclined downward to the right at an angle just sufficient to cause the boards to roll along, and at the right-hand end of rack 6 is another elevator E' arranged for taking off any of the boards from above or below the level of run A and from which elevator the boards are rolled to the right-hand end of run A to repeat the cycle.

The elevators E, E' may be of any suitable construction and are here indicated as electrically operated and controlled by hanging switches 7, 7' so that they may readily be raised or lowered to any of the layers of boards in the rack, the elevators are provided with channel tracks 3' adapted to be brought into coincidence with the ends of any of the layers of tracks in the rack, and also into endwise coincidence with the tracks extending to run C. The channels of the tracks are open to one another to permit the travel of the boards around the quadrangle and closed to prevent boards running off the ends of run C, extreme ends of the elevators, and sides of the elevators all as indicated in Fig. 1.

Along the run A at points F, F', F², F³ the track support framing is omitted and tracks are in short sections mounted on brackets 8 pivoted to the frame at 9 and the brackets pivoted to an operating link 10 so that the brackets at any of the points may be swung simultaneously to fold at right angles and thus provide a clear work passage on both sides of the candy slab boards at G, H and I for it is at these points where work must be done on the boards.

At position G the boards are covered with a sheet of paper drawn from a roll 11 passing through an oil bath in tank 12 so that the melted candy can be spread out on the oiled paper and will not stick to the board. A batch may be poured on the board at G or it may be rolled to H and the batch poured, or a batch may be poured on one board at G and on another board at H.

Before pouring the batch, heavy metal bars or edge strips 13 are laid on the table (and paper) to prevent the candy mass from running over, and the batch; preferably from a ladle or mixing receptacle carried on an overhead trolley, not shown; is dumped on the table and leveled off by hand to the surface of the bars, and after which the track brackets 8 are swung in place to make the tracks continuous and the boards are rolled to the left.

At the first line of position $F^2$ the boards are stopped by any suitable latch not shown and intermittently advanced over the closed bracket track sections to position I for removal of the bars 13 and for any decorating or coating of the surface of the candy (the candy having set sufficiently by this time). The track sections over $F^3$ are then closed and the board with its slab of candy 14 with a clear margin in therearound (see Fig. 3) is rolled under a cutting or scoring machine positioned at K where a series of knives 15 cuts or scores the candy lengthwise of the slab.

This cutter forms the subject matter of my copending patent filed under Serial No. 293,756 hence need not be further considered in the present specification.

From under the cutter at K the boards with their scored slabs pass along and under another cutter positioned at the end of the run at D for transverse scoring or cutting. The transverse cutter at D being also the subject matter of a copending patent, filed under Serial No. 293,756 need not be described in the present application.

It is of course evident that the transverse cutter may precede the longitudinal cutter, or with some grades of candy both cuttings may be carried out on one machine of suitable construction, but with the grade of candy known as fudge it is preferable to separate the cuttings by a time interval so that the candy will be firmer and the cuts will not drag too much.

It is of course understood that the slab boards may be of any width and length, and that the runs A and C may be of any length depending on the nature of product handled and which controls the time required for setting before cutting and hence the distance of cutting machines from the position where the candy is poured onto the table.

On the rack 6 the tracks are spaced a foot or more apart so as to allow of air circulation and the slab boards all roll downward to the right to line X where they are stopped by any suitable form of brake or latch, such as shown in Fig. 4 wherein a pair of pivoted dogs 16 are held in the path of the boards by springs 17 and are released by pulling a handle 18 connected by suitable linkage 19, it being understood that the linkage is offset below the plane of each tray, under the tracks so as not to interfere with the travel of the boards when the dogs are released.

A slab board on any layer released from position at X will roll down and again be stopped at the line XX adjacent the line of ascending and descending of the elevator E' by means of latches taking the form of upstanding plates 20 hinged to the framing 6 so that the plates may be swung downwardly to permit the boards to pass over, the plates returning through means of springs 21 like a spring hinge.

To thus swing the plates 20 for passage of the boards we provide hooks 22 normally engaging the plates and which hooks are pivoted to and project from a support 27, and are tripped by vertically movable bars 23 which are raised by means of a bell crank 24 operated by suitable linkage 25, controlled by hand levers 26 from a position near the end and center of the rack so that an operative standing in front of the elevator can reach over the elevator and release a board from any desired shelf or layer for rolling upon the elevator, each of the vertical bars 23 carry a releasing hook for a different layer of boards.

The general arrangement of apparatus also preferably includes a work or packing table positioned along the right-hand end of the layout as indicated at L with chairs or a bench at M for the operator to pack the candy removed from the boards, by an operator N, either while the board is on the elevator E', and brought to table height, or after rolling it to position G by the operator walking to N' and/or at any place along the length of table L.

In following the above description the operation will be clear without a further restatement of it, but it is desired to point out that although we show a layout in which the boards or trays of candy are manually pushed along the run C it is evident that in extremely long installation the boards may be forced or conveyed along by any means apart from man power if desired, also that while Fig. 1 shows swinging track sections at F, F', $F^2$, $F^3$ it is apparent without further drawing and description that the small supporting frame sections at points H and I instead of being fixed, may be bodily rollable along the floor over the distance bridged by swinging track brackets 8 thus dispensing entirely with the brackets, but we prefer the swinging track brackets and a rigid frame for the tracks.

In the appended claims the word "board" is meant to include tray, table, or other candy slab support handled generally in the manner described.

We claim:

1. In apparatus for handling candy in the manufacture thereof, a plurality of tracks, candy slab boards movable along said tracks and sections of said tracks mounted so as to be movable for opening a cross passageway through said tracks.

2. In apparatus for handling candy in the manufacture thereof, a plurality of tracks, candy slab boards movable along said tracks and sections of said tracks pivotally mounted at their ends so as to be movable for opening a cross passageway through said tracks.

3. In apparatus for handling candy in the manufacture thereof, a plurality of tracks, candy slab boards movable along said tracks and sections of said tracks pivotally mounted at their ends so as to be movable for opening a cross passageway through said tracks, and means connecting the track sections at one passage for simultaneous swinging of the sections.

4. In apparatus for handling candy in the manufacture thereof, a runway, a plurality of candy slab boards movable along said runway, lateral extensions from said runway whereby the boards may be moved out of said runway, a cooling rack extending between said extensions provided with a plurality of superimposed runways, and means for introducing the boards from one of said extensions to any of the superimposed runways at one end of the rack, and means for removal of the boards at the other end of the rack.

5. In a structure as specified in claim 4, means for returning the boards from the superimposed runways to the runway first mentioned.

6. In apparatus for handling candy in the manufacture thereof, a horizontally extending runway, candy slab boards movable along the runway, a paper supply roll at one end of the runway positioned for drawing across the boards in succession, and a candy slab cutter extending across the runway above the boards adapted for cutting candy slabs on the boards.

ANDREW OLSEN, Jr.
JAMES A. OLSEN.